United States Patent
Packman et al.

(10) Patent No.: US 6,883,234 B2
(45) Date of Patent: Apr. 26, 2005

(54) PROCESS FOR MACHINING AXIAL BLADE SLOTS IN TURBINE DISKS FOR JET ENGINES

(75) Inventors: Allan B. Packman, West Hartford, CT (US); Bernard D. Vaillette, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 85 days.

(21) Appl. No.: 10/266,021

(22) Filed: Oct. 7, 2002

(65) Prior Publication Data

US 2004/0064944 A1 Apr. 8, 2004

(51) Int. Cl.[7] ................................................ B23P 15/00
(52) U.S. Cl. ........................................ 29/889.2; 29/558
(58) Field of Search ............................. 29/889.2, 557, 29/558; 451/57, 541; 125/13.01; 409/244, 64, 131; 408/1 R

(56) References Cited

U.S. PATENT DOCUMENTS

| 4,505,075 A | * | 3/1985 | Salmon et al. ............... 451/9 |
|---|---|---|---|
| 4,512,115 A | * | 4/1985 | Miller ......................... 451/149 |
| 4,537,538 A | * | 8/1985 | Mitamura et al. ........... 409/217 |
| 4,566,225 A | * | 1/1986 | Bizot et al. ..................... 451/6 |
| 4,924,637 A | * | 5/1990 | Ikimi et al. .................... 451/41 |
| 5,152,669 A | * | 10/1992 | Heinig et al. ............ 416/219 R |
| 5,176,480 A | * | 1/1993 | Kelm ........................... 409/244 |
| 5,330,326 A | | 7/1994 | Kuehne et al. |
| 5,430,936 A | | 7/1995 | Yazdzik, Jr. et al. |

FOREIGN PATENT DOCUMENTS

| DE | 4114409 | * 10/1992 |
|---|---|---|
| DE | 4120640 | * 12/1992 |
| EP | 0550765 | * 7/1993 |
| GB | 2382317 | * 5/2003 |

* cited by examiner

Primary Examiner—Irene Cuda-Rosenbaum
(74) Attorney, Agent, or Firm—Bachman & LaPointe, P.C.

(57) ABSTRACT

A process for machining axial blade slots in turbine disks used in jet engines is provided. The process broadly includes the steps of providing a turbine disk, forming a roughened slot having a plurality of joined rectangular areas in the turbine disk, and machining the roughened slot to a finished slot.

5 Claims, 2 Drawing Sheets

PROCESS FOR MACHINING AXIAL BLADE SLOTS IN TURBINE DISKS FOR JET ENGINES

BACKGROUND OF THE INVENTION

The present invention relates to a process for machining axial blade slots in turbine disks for jet engines.

Retention slots are a design feature of turbine disks. The slots are used to hold or retain turbine blades around the periphery of the disk. Current practice in the aerospace industry is to machine these slots into the disk by use of a broaching machine, which is a linear cutting machine that drives successively larger cutters through the disk slot, with the final cutters having the fir tree or other appropriate shape of the finished slot. One technique which employs broaching is illustrated in U.S. Pat. No. 5,430,936 to Yadzik, Jr. et al. Broaching presents a number of issues, including costly cutter tools, very long tooling lead-time, very long tooling set-ups, and a very large single-purpose machine requiring a special concrete base and other infrastructure to support it.

Another method for producing profiled parts is illustrated in U.S. Pat. No. 5,330,326 to Kuehne et al. The method involves pre-shaping and finish grinding a blank in one chucking position with at least one profiled grinding wheel. The blank is translated and rotated relative to the at least one profiled grinding wheel during the pre-shaping step for giving the blank approximately a desired profile. The finished grinding step is performed at least partially after the pre-shaping step for smoothing surfaces and producing the final profile. The Kuehne et al. method may be used for external surfaces, such as the cutting of blades, and not internal surfaces. Thus, Kuehne et al.'s method is not applicable to the creation of internal slots.

There remains a need for a better approach to form the axial blade slots in a turbine disk.

SUMMARY OF THE INVENTION

Accordingly, it is an object of the present invention to provide an improved process for machining axial blade slots in turbine disks used in jet engines.

The foregoing object is attained by the process of the present invention.

In accordance with the present invention, a process for machining axial blade slots in a turbine disk is provided. The process broadly comprises the steps of providing a turbine disk, forming a roughened slot having a plurality of joined rectangular areas in the turbine disk, and machining the roughened slot into a finished slot.

Other details of the process for machining axial blade slots in turbine disks for jet engines, as well as other objects and advantages attendant thereto, are set forth in the following detailed description and the accompanying drawings wherein like reference numeral depict like elements.

DETAILED DESCRIPTION OF THE PREFERRED EMBODIMENT(S)

Figure 1:
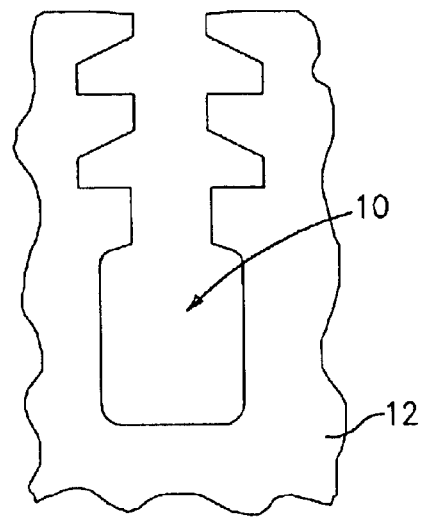
FIG. 1 is a schematic representation of a portion of a turbine disk showing blade retention slots.

The present invention relates to a process for machining axial blade slots, such as those designated by the reference numeral 10 in FIG. 1, in turbine disks 12 for use in jet engines. The process initially involves the step of providing a blank turbine disk 12. The blank turbine disk 12 may be formed from a nickel based superalloy, a titanium based superalloy, steel, or another suitable material.

Figure 2A:
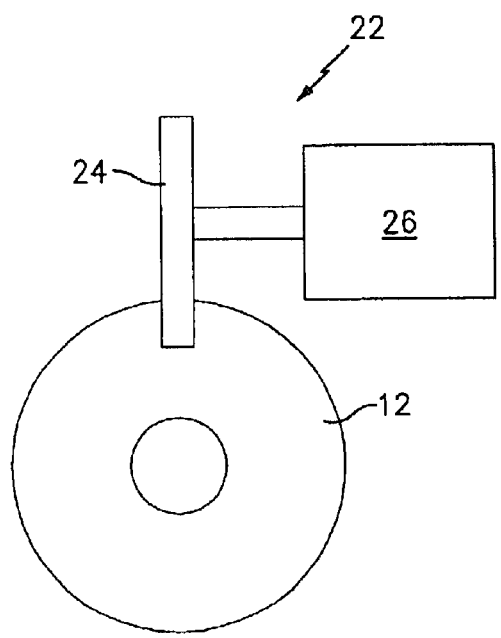
FIG. 2A is a schematic representation of a tool for roughing a slot in a turbine disk.
Figure 2B:
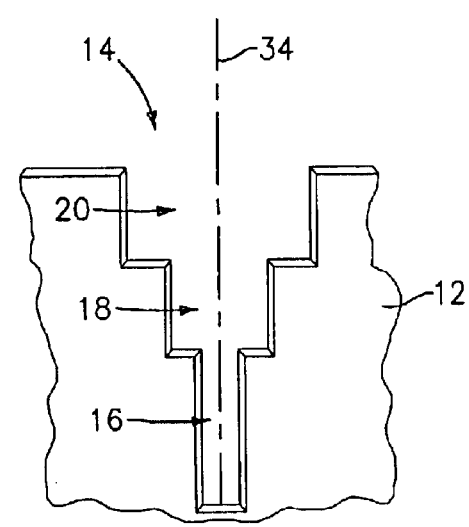
FIG. 2B illustrates a roughened slot produced using the system of FIG. 2A.
Figure 3A:
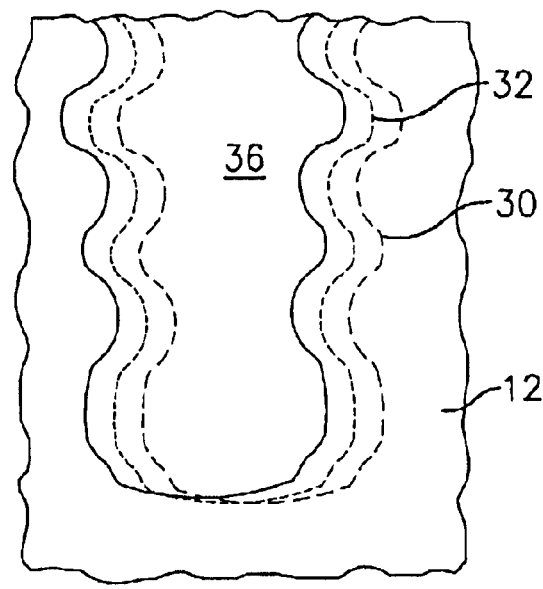
FIG. 3A is a schematic representation of a two pass finish processing step which may be used in the process of the present invention.
Figure 3B:
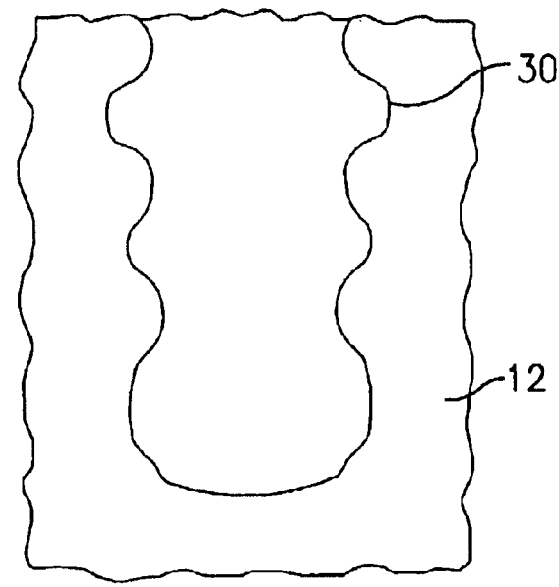
FIG. 3B is a schematic representation of a single pass finish processing step which may be used in the process of the present invention.

The next step in the process is to form a series of roughened slots 14 in the blank disk 12. Each of the roughened slots 14 has a plurality of joined rectangular areas such as 2, 3, or 4 joined rectangular areas. FIG. 2B illustrates a roughened slot having three rectangular areas 16, 18, and 20. The rectangular areas 16, 18 and 20 may be formed using a grinding machine 22 such as that shown in FIG. 2A and a series of superabrasive grinding wheels 24 connected to a spindle 26. A superabrasive grinding wheel is a class of wheels where the abrasive material is diamond or cubic boron nitride.

To form a roughened slot such as that shown in FIG. 2B, a first superabrasive grinding wheel 24 having a first thickness is used to form the rectangular area 20. After the rectangular area 20 has been formed, a second superabrasive grinding wheel having a second thickness less than the first thickness is connected to the spindle 26 and used to form the rectangular area 18. Thereafter, a third superabrasive grinding wheel having a third thickness less than the second thickness is connected to the spindle 26 and used to form the rectangular area 16. Each of the grinding wheels preferably has a diameter in the range of six inches to twelve inches, is formed from tool steel, and preferably has a single layer carbon boron nitride thereon to form the wheel grinding surfaces. The carbon boron nitride may be electroplated or brazed to the underlying tool steel. During formation of each roughened slot 14, a coolant, such as an oil coolant, may be used to reduce excessive heat.

After the roughened slot 14 has been formed, a finished slot 30 is formed. The finished slot 30 may be formed using one of two different processes. In a first process, the finished slot 30 is formed in two steps using two quills having a diameter less than a width W of the finished slot and a profile identical to the profile of the finished slot. In this process, a semi-finished slot 32 is formed using a first quill 36. The first quill is offset in a first direction relative to the centerline 34 of the roughened slot 14 and then offset in a second direction opposite to the first direction. The first quill is then removed and a second quill is used to form the finished slot 30. The second quill is also offset in one direction relative to the centerline 34 to finish a first side and then offset in a second direction, opposed to the first direction, to finish a second side. Preferably, each of the quills has a diameter in the range of 0.020 to 0.030 inches less than the width of the finished slot. If desired, a single quill could be used to form the semi-finished and finished slots instead of two different quills.

In an alternative or second process, the finished slot 30 is formed using two quills. The first quill has a dimension slightly less than that of the finished slot 30. The second quill has the same dimension as the finished slot 30. In such an approach, the first quill is aligned with the centerline 34 of the roughened slot and used to form a semi-finish slot in a single pass and the second quill is aligned with the centerline of the semi-finished slot to form the finish cut in one pass, cutting both sides of the slot simultaneously.

Each of the quills used to perform the cuts has a single layer of carbon boron nitride electroplated or brazed on a tool steel form. During machining of the semi-finished and/or finished slots, a coolant, such as an oil coolant, may be used to avoid excessive heat.

The finishing quill should have proper abrasive grit size and distribution to form slot walls with a roughness under 65 Ra. Typically, a semi-finishing quill will have a grit size in the range of 60 to 120, while the finishing quill will have a grit size in the range of 170 to 340.

It is apparent that there has been provided in accordance with the present invention a process for machining axial blade slots in turbine disks for jet engines which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations to embrace those alternatives, modifications, and variations which fall within the broad scope of the appended claims.

What is claimed is:

1. A process for machining axial blade slots in a turbine disk for an engine comprising the steps of:

providing a turbine disk;

forming a roughened slot having a plurality of joined rectangular areas in said turbine disk;

machining the roughened slot to a finished slot;

said forming step comprising forming said roughened slot using at least one superabrasive grinding wheel; and said forming step further comprising providing a plurality of grinding wheels each having a diameter in the range of six to twelve inches and a single layer of carbon boron nitride grit and sequentially using said wheels to form said roughened slot having said joined rectangular areas.

2. A process for machining axial blade slots in a turbine disk for an engine comprising the steps of:

forming a roughened slot having a plurality of joined rectangular areas in said turbine disk;

machining the roughened slot to a finished slot; and said machining step comprising providing a quill having a diameter less than a width of the finished slot and a profile identical to a profile of the finished slot, offsetting the quill in a first direction relative to a centerline of said roughened slot to form a first side of the finished slot, and offsetting the quill in a second direction opposed to said first direction to form a second side of the finished slot.

3. A process according to claim 2, wherein said quill providing step comprises providing a quill having a diameter in t he range of 0.020 to 0.030 inches less than the width of the finished slot.

4. A process for machining axial blade slots in a turbine disk for an engine comprising the steps of:

providing a turbine disk;

forming a roughened slot having a plurality of joined rectangular areas in said turbine disk;

machining the roughened slot to a finished slot;

said machining step comprising machining a semi-finished slot and machining said semi-finished slot into said finished slot; and said semi-finished slot machining step comprising machining a semi-finished slot using a quill having a grit size in the range of 60 to 120 and the finished slot machining step comprising machining a finished slot using a quill having a grit size in the range of 170 to 340.

5. A process for machining axial blade slots in a turbine disk for an engine comprising the steps of:

providing a turbine disk;

forming a roughened slot having a plurality of joined rectangular areas in said turbine disk;

machining the roughened slot to a finished slot; and said machining step comprising aligning a semi-finish tool having dimensions less than the dimensions of the finished slot, creating a semi-finished slot in a single pass using said semi-finish tool, aligning a finish tool on a centerline of the semi-finished slot, and creating said finished slot in a single pass using said finish tool.

* * * * *

UNITED STATES PATENT AND TRADEMARK OFFICE
CERTIFICATE OF CORRECTION

| | |
|---|---|
| PATENT NO. | : 6,883,234 B2 |
| APPLICATION NO. | : 10/266021 |
| DATED | : April 26, 2005 |
| INVENTOR(S) | : Allan B. Packman et al. |

Page 1 of 1

It is certified that error appears in the above-identified patent and that said Letters Patent is hereby corrected as shown below:

In column 3, claim 2, between lines 2 and 3, insert -- providing a turbine disk; -- as a paragraph in its place.

Signed and Sealed this

Twelfth Day of September, 2006

JON W. DUDAS
*Director of the United States Patent and Trademark Office*